United States Patent [19]
Oakes et al.

[11] Patent Number: 5,322,373
[45] Date of Patent: Jun. 21, 1994

[54] VENTED, OIL BATH LUBRICATED BEARING STRUCTURE FOR A MOTOR

[75] Inventors: Bryan K. Oakes, Gastonia; Donald F. Kus; William Subler, both of Kings Mountain, all of N.C.

[73] Assignee: Reliance Electric Industrial Co., Cleveland, Ohio

[21] Appl. No.: 56,315

[22] Filed: Apr. 30, 1993

[51] Int. Cl.$^5$ .................... F16C 33/66; F16C 33/76
[52] U.S. Cl. .................... 384/462; 384/471; 384/479
[58] Field of Search ............ 384/462, 466, 471, 479; 310/88, 90

[56] References Cited

U.S. PATENT DOCUMENTS

| | | |
|---|---|---|
| 2,210,705 | 8/1940 | Brown . |
| 3,466,478 | 9/1969 | Gail . |
| 3,833,276 | 9/1974 | Baumann et al. ............... 384/466 |
| 4,039,229 | 8/1977 | Ohlberg . |
| 4,712,442 | 12/1987 | Baika et al. ............... 384/462 X |
| 4,844,625 | 7/1989 | Katzuzawa et al. . |
| 4,952,077 | 8/1990 | Kurt ............... 384/462 |
| 5,001,377 | 3/1991 | Parkinson . |

OTHER PUBLICATIONS

"Engineering Report," by Coltec Industries, Richard Borowski, Senion Development Engineer, Klozure® Oil Seals, Sheet 1, dated Jan. 8, 1990.

"The Garlock Equalizer" brochure by Coltec Industries, 1666 Division Street, Palmyra, N.Y., 14522, No. TP-Jul. 1992-25M.

*Primary Examiner*—Thomas R. Hannon
*Attorney, Agent, or Firm*—Jones & Askew

[57] ABSTRACT

A venting system is disclosed in connection with a high speed electric motor having oil bath lubricated ball bearings. The bracket and cap which enclose the bearing define mating passageways which, in combination upon assembly, lead from inside the inboard bearing seal to the outside atmosphere. The venting passageway maintains a chamber next to the bearing seal at substantially outside atmospheric pressure, so that no lubricant will be sucked out of the bearing structure. However, because the passageway is formed automatically upon assembly of the cap and bracket, no extra steps or awkward assembly of parts is required.

12 Claims, 5 Drawing Sheets

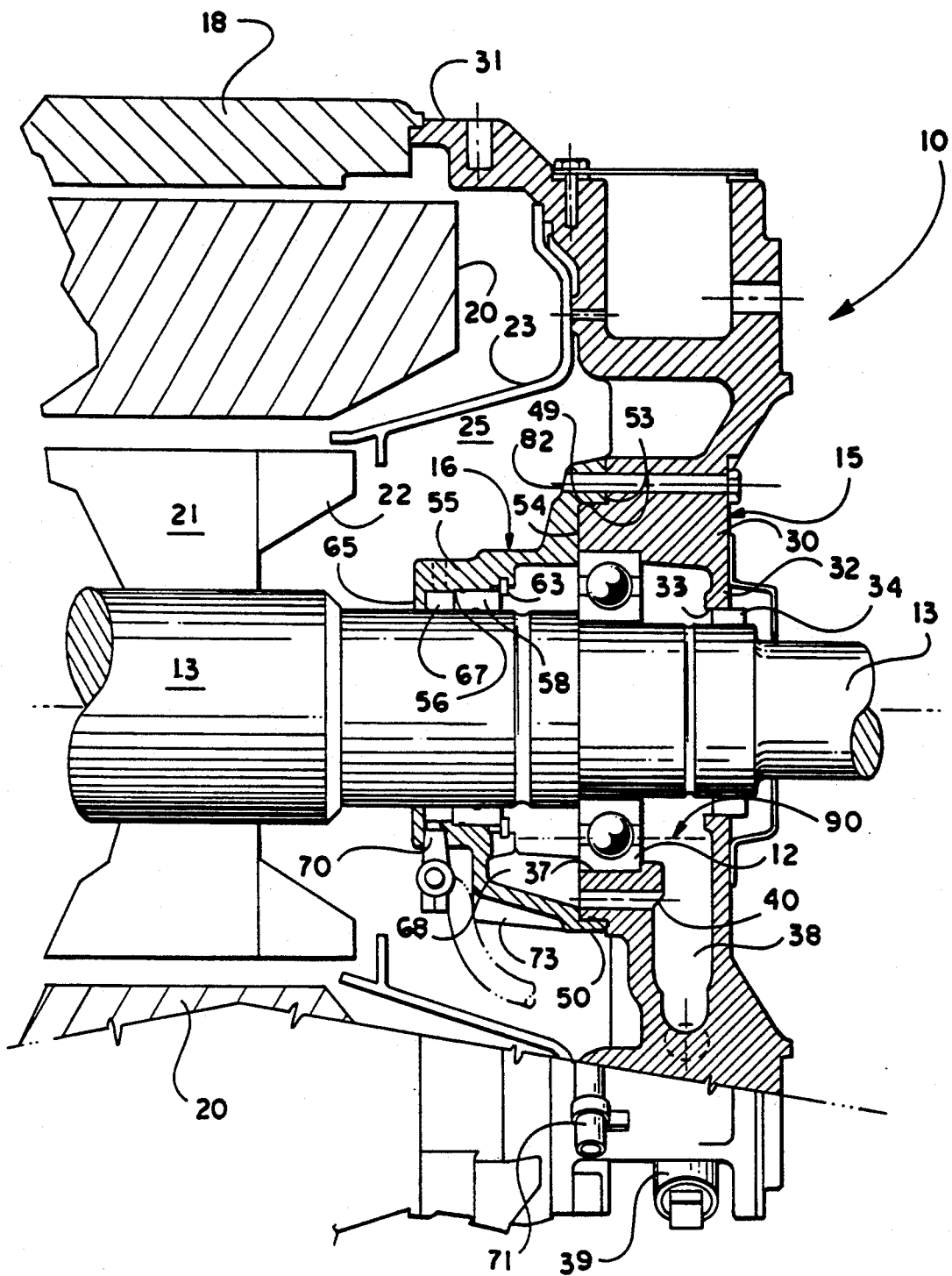
Fig_1

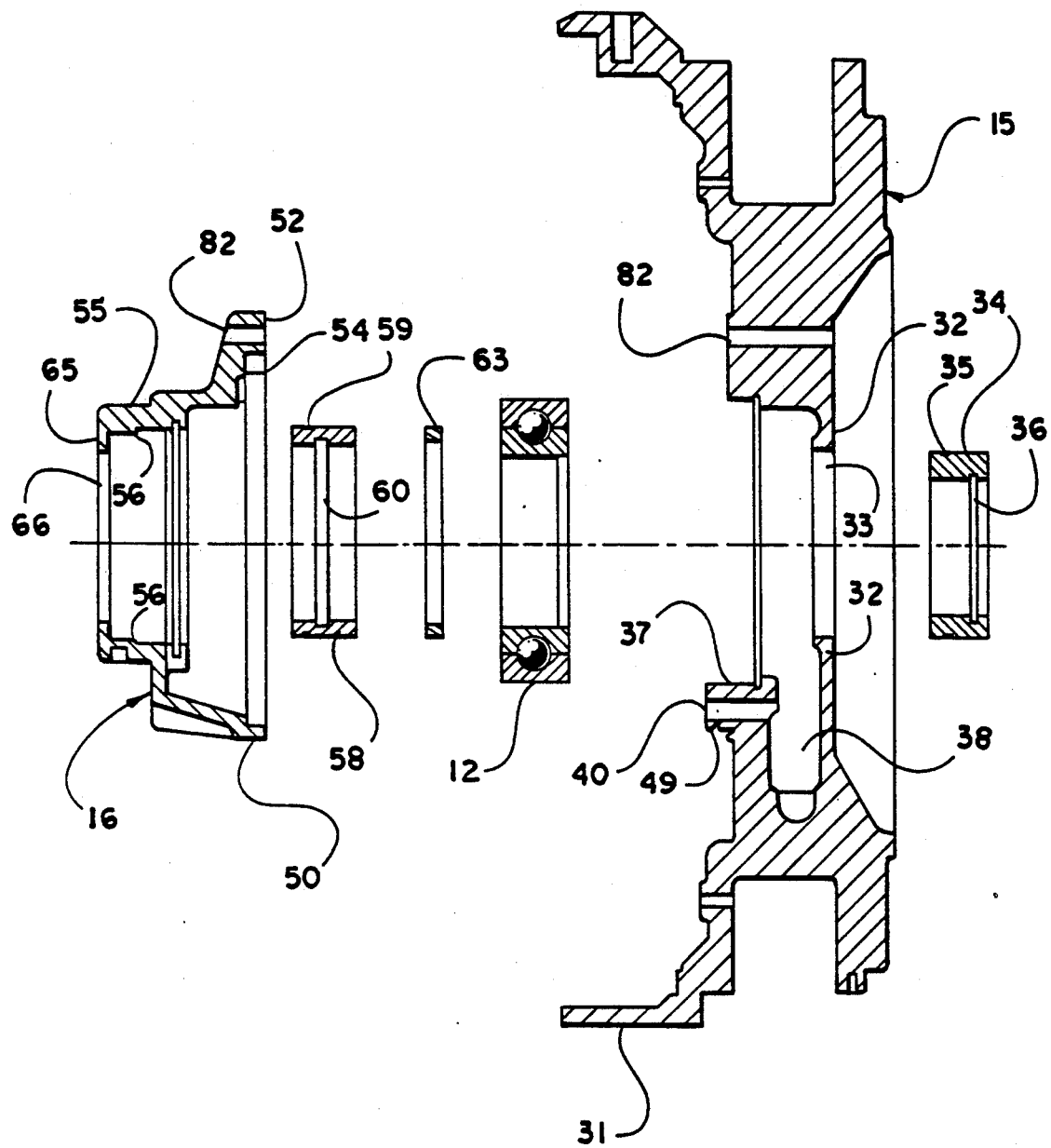
Fig_2

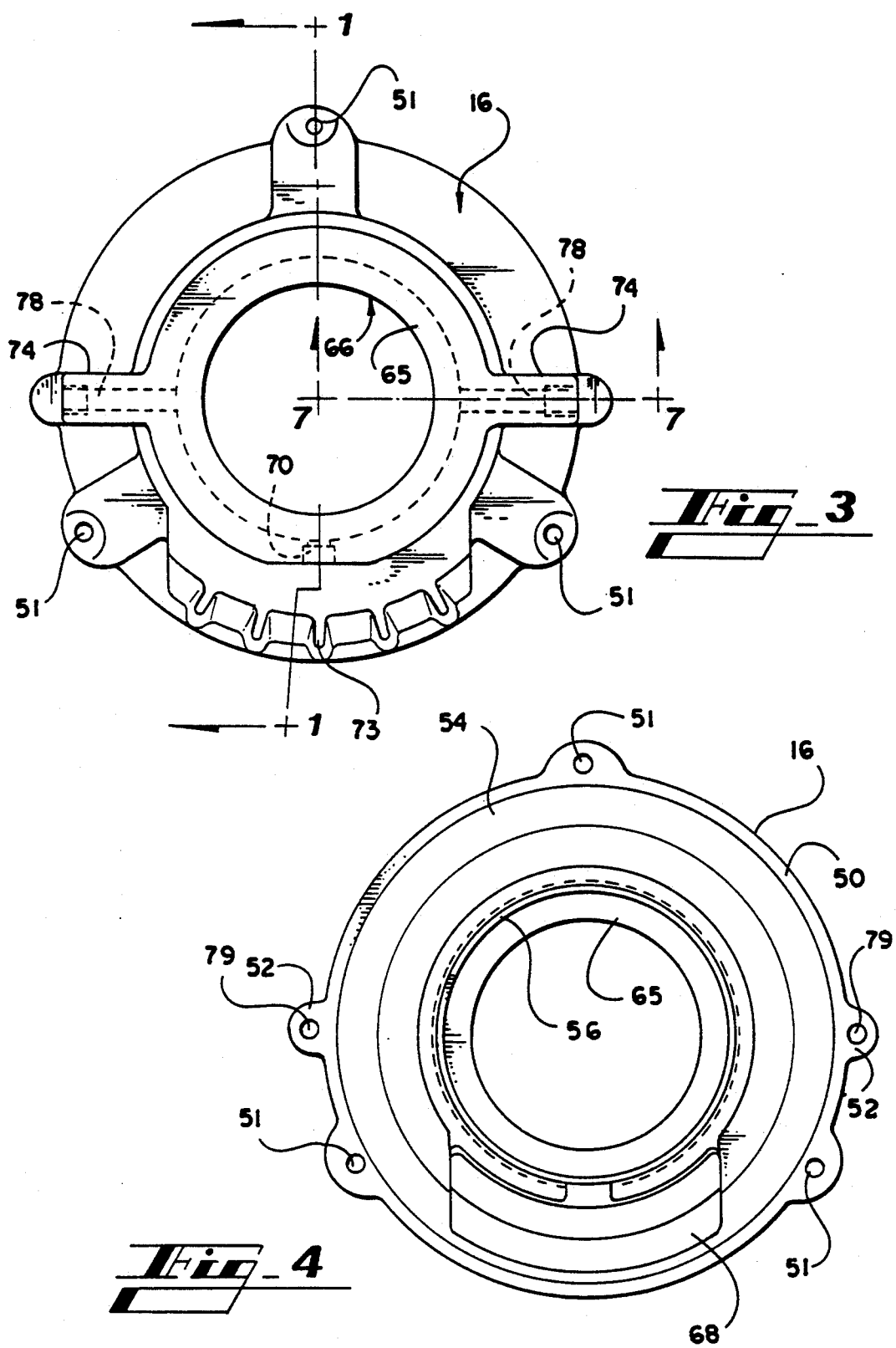

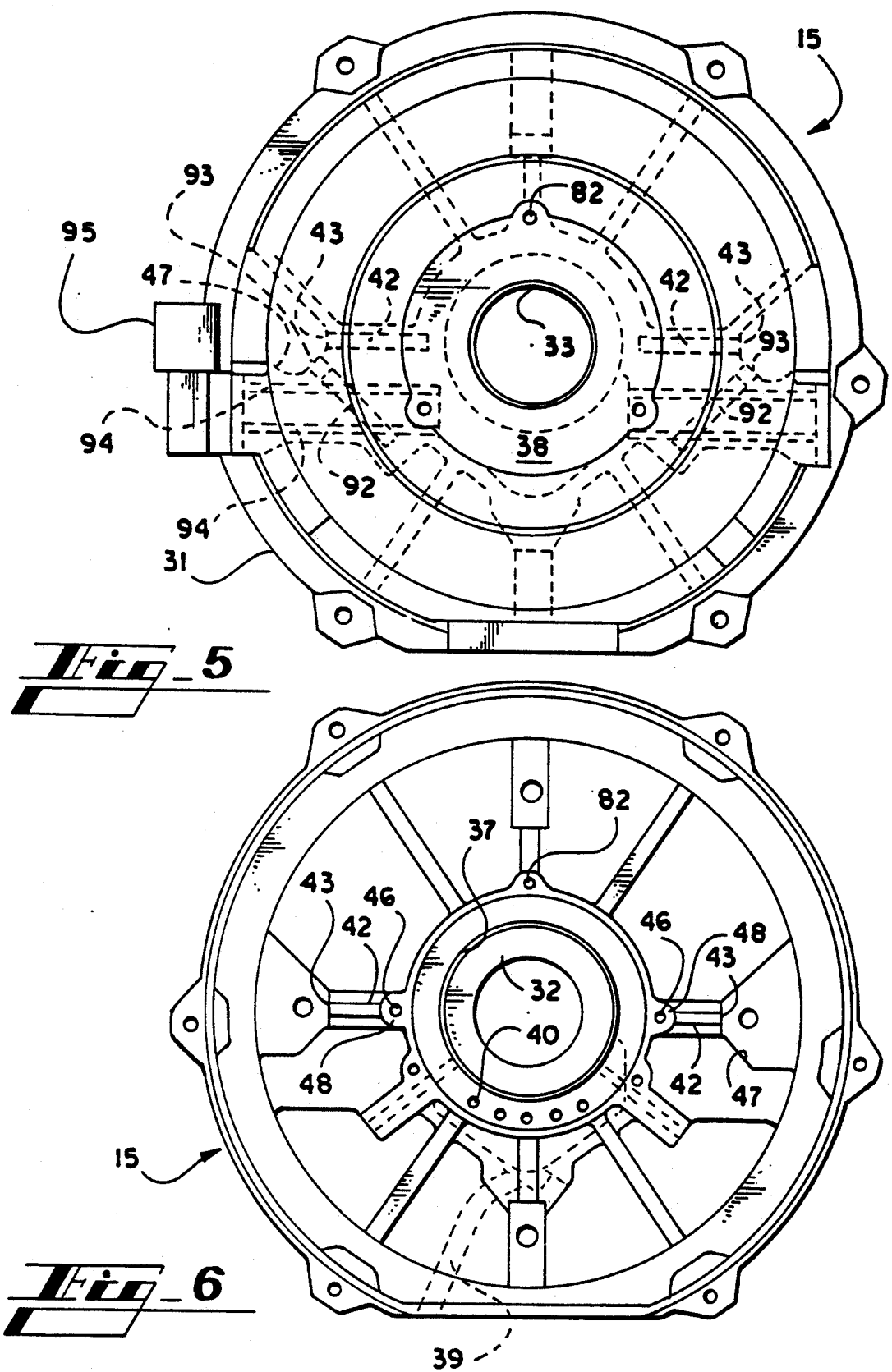

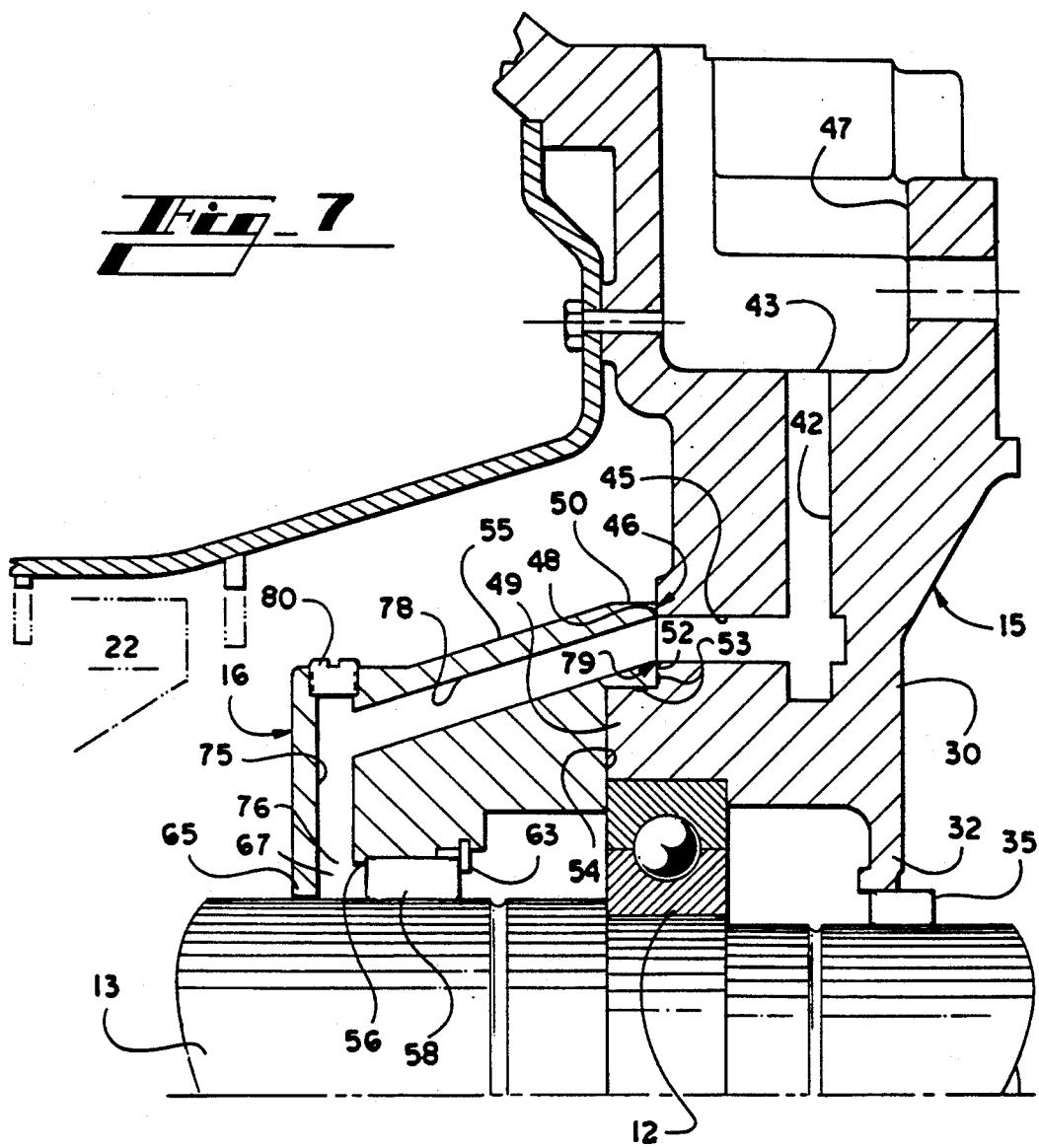
Fig_7

VENTED, OIL BATH LUBRICATED BEARING STRUCTURE FOR A MOTOR

TECHNICAL FIELD

The present invention relates to bearings for high speed rotary devices such as electric motors, and more particularly relates to a vented bearing support structure for an oil bath lubricated ball bearing.

BACKGROUND ART

Large induction motors are required for many heavy duty applications, such as driving air conditioning compressors for large buildings. These motors must deliver in excess of 900 horsepower at 3600 rpm, and also must operate properly at low speeds under 10 rpm. In the case of D-flange motors, the compressor is connected directly to the motor housing, limiting access to the bearings after installation. Therefore, lubrication of the motor bearings in these applications has been an area of great concern.

Grease lubrication has been used in many large motors, because of the difficulty in maintaining a film of oil in large sleeve bearings operating at low rpm. However, when bearings are lubricated with grease and operated at high rpm, the grease begins to churn and becomes overheated, leading to break down of the lubricant. Sleeve bearings on fairly large motors have been oil lubricated using an oil mist system or oil distribution rings which dip into an oil sump and then deliver oil to the bearing. However, sleeve bearings require very accurate alignment and therefore are not desirable in D-flange motors.

The rotor of an induction motor is typically positioned on the motor shaft within an interior space enclosed by the stator windings and the bearing support structure. Motor bearings are normally captured between a bracket defining a cavity for receiving the bearing, and a cap which holds the bearing in the bracket. Bearing seals also held by the cap or bracket are positioned on either side of the bearing to retain lubricant and exclude contaminants. It is known to utilize protrusions or blades extending from the ends of the rotor as a fan to draw cooling air into the interior and to distribute the air over and between the interior parts. The action of these protrusions reduces the pressure within the interior space between the rotor end and the bracket, and may cause the bearing lubricant to be pulled from the bearing structure and seals into the inner portions of the motor. Lubricant contacting the windings of the motor tends to swell and deteriorate the insulation, and eventually shorts out the motor, causing it to fail. Other problems associated with loss of lubricant may occur in other rotary devices which include bearings.

Various attempts have been made to equalize the pressure on both sides of bearings in order to prevent lubricant leakage. Hoses have been connected between the inner side of the bearing and the exterior wall of the housing or bearing support structure, but it is very difficult to connect the hoses while assembling the bearing. U.S. Pat. No. 4,039,229 discloses a grease-lubricated bearing with a flexible membrane enclosing the grease chamber. A passageway through the motor housing from the membrane to atmosphere allows the membrane to flex, thereby relieving any pressure increase within the grease chamber. U.S. Pat. No. 3,466,478 discloses spaces on either side of a ball bearing, connected by passages formed in the bracket. The pressure drop normally present is made to occur at restricted orifices between the spaces and the air adjacent to both sides of the bearing.

Passageways through bearing support structures for the purpose of conducting lubricants are shown in U.S. Pat. Nos. 4,844,625 and 5,001,377. Such passageways do not open to the interior space within the motor, in order to avoid pumping lubricant to undesirable areas. U.S. Pat. No. 2,210,705 shows a ball bearing immersed in an oil bath.

Despite prior efforts, there has remained a need in the art for a high speed motor with oil lubricated ball bearings and a system for venting the space on the inner side of the bearings to ambient atmosphere without requiring any extra steps in assembling the bearing.

SUMMARY OF THE INVENTION

The present invention addresses the problem of lubricant loss from bearings caused by low pressure generated within an interior space of a rotary device by providing venting passageways designed into the bearing support structure. Passageway segments in the parts of the support structure are positioned to matingly communicate with each other as the bearing is assembled within such parts. The result is a venting passageway to outside atmospheric pressure formed automatically as a result of routine bearing assembly steps. The venting passageway protects the bearing and associated bearing seals from the effects of low pressure in the interior space within the device.

Generally described, the present invention provides a bearing support structure positioned between an enclosed interior space and an outside atmosphere, comprising an inner bearing support member defining therein a first passageway segment extending from an inner opening communicating with the interior space to a first mating opening; a shaft seal carried by the inner support member at a location on the outward side of the inner opening; and an outer bearing support member defining therein a second passageway segment extending from a second mating opening to an outer opening communicating with the outside atmosphere; the inner and outer support members defining a receptacle therebetween for receiving a bearing positioned outwardly of the shaft seal, and being attached to one another with the mating openings aligned so as to create a vent passageway extending from the interior space to the outside atmosphere.

The first passageway segment preferably comprises an inner radial bore extending from the inner chamber into the inner support member, and an inner axial bore extending from the first mating opening to intersect the inner radial bore. The second passageway segment preferably comprises an outer radial bore extending from the outer opening to a point within the outer bearing support member, and an outer axial bore extending from the second mating opening to intersect the outer radial bore.

In order to maximize the top speed of the shaft while providing sufficient lubrication at slow speeds, the bearing is preferably a ball bearing immersed in an oil bath contained in the sump defined by the bearing support structure.

The present invention also provides a method of venting a bearing and associated shaft seal contained in a bearing support structure positioned between an enclosed interior space and an outside atmosphere, comprising the steps of providing in an inner bearing support member a first passageway segment extending from an inner opening communicating with the interior space to a first mating opening; providing in an outer bearing support member a second passageway segment extending from a second mating opening to an outer opening communication with the outside atmosphere; and assembling the inner and outer support members to receive the bearing therebetween and to meet one another with the mating openings aligned so as to create a vent passageway extending from the interior space to the outside atmosphere.

Thus, it is an object of the present invention to provide an improved bearing construction for rotary devices.

It is a further object of the present invention to provide an improved oil lubricated bearing structure for a high speed rotary device.

It is a further object of the present invention to provide an improved high speed electric motor not subject to problems caused by low pressure created within the motor.

It is a further object of the present invention to provide an improved venting system for a bearing.

It is a further object of the present invention to provide an easily assembled venting system for bearings of an electric motor.

Other objects, features and advantages of the present invention will be appreciated upon reviewing the following description of a preferred embodiment of the invention in conjunction with the attached drawing.

BRIEF DESCRIPTION OF THE DRAWING

FIG. 1 is a vertical cross sectional view of one end of a motor embodying the bearing construction of the present invention.

FIG. 2 is an exploded vertical cross sectional view of the bearing support construction of FIG. 1.

FIG. 3 is a plan view of the convex side of a bearing cap according to the present invention, which faces the interior of the motor.

FIG. 4 is a plan view of the concave side of the cap which faces the bearing.

FIG. 5 is a plan view of the convex side of a bearing bracket according to the present invention, which faces away from the bearing.

FIG. 6 is a plan view of the concave side of the bearing bracket which receives the bearing.

FIG. 7 is a partial horizontal cross sectional view of the bearing support structure showing the venting passageway, taken along line 7—7 of FIG. 3, the structure being symmetrical about the centerline shown.

DETAILED DESCRIPTION

Referring now in more detail to the drawings, in which like numerals refer to like parts throughout the several views, FIG. 1 shows a cross sectional view of a bearing support structure assembly 10 embodying the present invention. The support structure assembly 10 supports a ball bearing 12 which is shrink fit onto a shaft 13. The bearing 12 fits into a bracket 15 and is held in the bracket 15 by a cap 16 in a manner described in detail below. The bracket is attached at its periphery to a motor housing 18, within which are positioned conventional stator windings 20 and a rotor 21 on the shaft 13. A plurality of fan blades 22 extend from the rotor 21 toward the support structure 10.

An interior space 25 is defined generally between the bearing support structure 10, the rotor 21, and a cone-shaped baffle 23 which is attached to the bracket 15 and extends slightly between the stator windings 20 and the rotor fan blades 22. The blades 22 act as a fan as the rotor 21 and shaft 13 rotate, pulling cooling air through openings (not shown) in the bracket. The cooling air is directed by the baffle 23 into the rotor fan 22, and discharged into the space between the rotor and stator, and other interior parts of the motor. At high motor speeds, the suction creating this air flow reduces the pressure within the interior space 25 to a level at which there is a danger of lubricant being pulled out of the bearing support structure and spread into the motor's interior. As explained above, lubricant in the windings of the motor can result in motor failure.

The construction of the bearing support structure assembly 10 can be understood in more detail with reference to FIGS. 2-7. FIG. 2 is an exploded vertical cross sectional view of the bracket 15, cap 16, and parts positioned therein. The bracket 15 includes a peripheral collar 31 which attaches to the motor housing 18. A central portion 30 of the bracket includes a throat 32 which defines a shaft seal opening 33. An outboard seal 34 fits into the opening 33 and includes a fluoroelastomer o-ring seal 35 between the stationary portion of the seal 34 and the throat 32. The rotor portion of the seal 34 engages the shaft 13 with an o-ring 36 between the two parts. The outboard seal preferably is a commercially available, labyrinth type seal, such as INPRO/SEAL Bearing Isolator Part No. M5904928A.

In its concave surface facing the motor interior, the bracket 15 defines an annular recess 37 for receiving the bearing 12, which preferably is a brass-caged ball bearing. At the lower portion of the bracket, a sump opening 38 is cast for holding oil. The lubricant is preferably a light turbine oil with an anti-foaming agent, or Mobil DTE Light, ISO VG32. A drain opening 39 extends from the bottom of the sump 38 to an accessible plug, as shown in FIG. 1. Spaced slightly below the bearing recess 37, a plurality of sump passageways 40 connect the sump 38 to the interior of the cap 16.

Referring now to FIGS. 5–7, a radial vent bore 42 is drilled from an outer opening 43 radially into the bracket 15. The opening 43 communicates with the ambient air within a protective recess 47 along the outer periphery of the bracket. An axial vent bore 45 is drilled into the bracket from an opening 46 until it intersects the bore 42. The opening 46 is formed in a radial surface 48 of the bracket which faces the cap 16. Radially inwardly from the surface 48, an annular protrusion 49 extends toward the cap, separating the surface 48 from the bearing 12.

The cap 16, shown in detail in FIGS. 2–4, defines an annular peripheral lip 50 which fits over the protrusion 49 of the bracket 15. Three bolt holes 51 are provided for attachment of the cap to the bracket. At the horizontal midpoint of the cap, as shown in FIG. 4, the lip extends outwardly to form a radial surface 52 which fits flush against the radial surface 48 of the bracket. O-ring seals 53 positioned between the lip 50 and the bracket seal the joint between the cap and the bracket. Radially inwardly from the lip 50, an annular surface 54 of the cap is positioned to clamp the bearing 12 into the recess 37 in the bracket. A body portion 55 of the cap extends from the lip 50 away from the bearing and toward the shaft 13.

On the concave side of the cap a shoulder 56 is formed, and an inboard seal 58 is received axially against the shoulder 56. The seal 58 includes a fluoroelastomer o-ring seal 59 between the stationary portion of the seal 58 and the cap 16. The rotor portion of the seal 58 engages the shaft 13 with an o-ring 60 between the two parts. A snap ring 63 fits into a groove in the cap to retain the seal 58 against the shoulder 56. Extending still farther from the bearing, the cap defines a throat 65 which extends radially inwardly to a shaft opening 66 closely adjacent to the shaft 13. A chamber 67 is formed between the throat 65 and the inboard seal 58, and is open to the shaft 13. The throat 65 restricts free flow of air from the chamber 67 through the shaft opening 66 into the interior space 25. The inboard seal 58 preferably is a commercially available, labyrinth type seal which allows passage of air through the seal, such as INPRO/SEAL Bearing Isolator Part No. BI05012A.

The cap 16 also defines a sump portion 68 directly opposite the sump 38 of the bracket 15. The sump 68 communicates with the sump pass through openings 40 so that oil can pass freely between the sumps 38 and 68. On the convex side of the cap opposite the sump 68, a plurality of cooling fins 73 extend into the interior space 25. The flow of cooling air created by the blades 22 cools the fins 73 and, by conduction and convection, the oil in the sump 68. As best shown in FIG. 1, a drain opening 70 is provided in the bottom of the cap between the inboard seal 58 and the throat 65. Any oil or condensate escaping through the seal 58 will have an opportunity to drain through the opening 70 and an attached hose 71 to the exterior of the motor. The presence of any oil exiting through this hose may provide an early warning that oil is escaping from the bearing seal before the oil contaminates the interior of the motor.

Again at the horizontal midpoint of the cap 16, a protrusion 74 is cast on the convex side of the cap between the surface 52 and the throat 65, as best shown in FIG. 3. Referring to FIG. 7, a radial vent bore 75 is drilled through the protrusion 74 from the chamber 67 starting at an inner opening 76. An approximately axial vent bore 78 is drilled from a cap mating opening 79 in the surface 52 into the protrusion 74 until it intersects the radial vent bore 75. A plug 80 is used to close off the open outer end of the radial vent bore 75, although the bore may be ended inside the cap as an alternative.

It will be understood from the foregoing that the vent bores 42, 45, 75 and 78 form a venting passageway from the outside ambient atmosphere to the chamber 67. The mating openings 46 and 79 align when the radial surfaces 48 and 52 abut one another during assembly of the cap and bracket about the bearing 12. Thus, in the assembly stage of motor manufacture, the bearing may be vented without any extra steps or installation of awkward parts, as was the case with hose vents. The chamber 67 isolates and protects the inboard seal 58 and the bearing 12 from low pressure created by the rotor fan blades 22. The negative pressure in the space 25 draws air from the chamber through the shaft opening 66, but the restriction at the throat 65 causes the pressure drop to occur at the restriction, rather than at the seal 58. The pressure within the chamber 67 remains near outside atmospheric pressure because of the unrestricted venting passage to the outside.

The oil in the sumps 58, 68 is maintained at a level 90, shown in FIG. 1, which immerses a portion of the balls of the ball bearing 12. As shown in FIG. 5, a fill passage 92 extends through the bracket 15 from a fill opening 93 in the recess 47 to the sump 58. Alternately, the oil level may be automatically maintained through passageways 94 by a conventional constant level oiler 95.

The bearing support structure 10 is assembled by first placing the inboard seal into cap 16, inserting the snap ring 63, and sliding the cap over the shaft 13. Then the bearing is heated for expansion and placed onto the shaft against a locating shoulder in a conventional manner. As the bearing cools it becomes shrink fit onto the shaft. After the rotor is inserted into the motor, the bracket with baffle 23 installed is placed over the shaft and bolted to the cap and to the housing 18. Finally, the outboard seal is slid onto the shaft into the seal opening 33 in engagement with the throat 32 of the bracket. If desired, the constant level oiler 95 may then be attached.

In operation, the rotation of the blades 22 of the rotor 21 may cause a pressure differential in the space 25, as explained above. However, such a differential will not affect the bearing or inboard seal because of free air flow through the venting passageway formed in the cap and bracket to the chamber 67, which will remain near outside ambient pressure. Furthermore, air can flow through the seals 35 and 58 to equalize the pressure on both sides of the bearing 12. As a result, no lubricant will be sucked out of the bearing structure and problems associated with lubricant spreading into the interior of the motor will be avoided.

While this invention has been described with particular reference to a preferred embodiment, it should be understood that variations and modifications may be made without departing from the spirit and scope of the invention as defined in the appended claims.

We claim:

1. A bearing support structure for a bearing carried by a shaft, positioned between an enclosed interior space and an outside atmosphere, comprising:

an inner bearing support member defining a throat positioned to fit around said shaft, and a first passageway segment therein extending from an inner chamber adjacent to said throat to a first mating opening;

said throat restricting free flow of air from said inner chamber to said interior space;

a shaft seal within said inner support member at a location on the outward side of said inner chamber;

an outer bearing support member defining therein a second passageway segment extending from a second mating opening to an outer opening communicating with said outside atmosphere;

said inner and outer support members defining a receptacle therebetween for receiving said bearing positioned outwardly of said shaft seal, and being attached to one another with said mating openings aligned so as to create a vent passageway extending from said inner chamber to said outside atmosphere; and an oil reservoir defined by at least one of said inner and outer support members and positioned so that said bearing receptacle is at least partially within said reservoir.

2. The bearing support structure of claim 1, wherein said outer bearing support member comprises a bracket including an outside facing circumferential surface exposed to said outside atmosphere, and wherein said outer opening is defined in said circumferential surface.

3. The bearing support structure of claim 2, wherein said inner bearing support member comprises a cap including a cylindrical surface facing radially inwardly, and wherein said inner chamber is defined in said cylindrical surface and extends radially inwardly to said shaft.

4. The bearing support structure of claim 1, wherein said oil reservoir is defined between said attached inner and outer support members.

5. The bearing support structure of claim 1, wherein said inner and outer support members are attached at mating radial surfaces which define said mating openings.

6. The bearing support structure of claim 5, wherein said first passageway segment comprises an inner radial bore extending from said inner chamber into said inner bearing support member, and an inner axial bore extending from said first mating opening to intersect said inner radial bore.

7. The bearing support structure of claim 6, wherein said second passageway segment comprises an outer radial bore extending from said outer opening to a point within said outer bearing support member, and an outer axial bore extending from said second mating opening to intersect said outer radial bore.

8. A bearing assembly comprising a ball bearing carried by a shaft and a bearing support structure positioned between an enclosed interior space and an outside atmosphere, comprising:
an inner bearing support member defining a throat positioned to fit around said shaft, and a first passageway segment therein extending from an inner chamber adjacent to said throat to a first mating opening;
said throat restricting free flow of air from said inner chamber to said interior space;
a shaft seal carried by said inner support member at a location on the outward side of said inner chamber;
an outer bearing support member defining therein a second passageway segment extending from a second mating opening to an outer opening communicating with said outside atmosphere;
said inner and outer support members defining a receptacle therebetween for receiving said ball bearing positioned outwardly of said shaft seal, and being attached to one another with said mating openings aligned so as to create a vent passageway extending from said inner chamber to said outside atmosphere; and
an oil reservoir defined by at least one of said inner and outer support members and positioned so that said bearing receptacle is at least partially within said reservoir.

9. A method of venting a bearing carried by a shaft and an associated shaft seal contained in a bearing support structure positioned between an enclosed interior space and an outside atmosphere, comprising the steps of:
providing in an inner bearing support member a first passageway segment extending from an inner opening inside said shaft seal to a first mating opening;
providing in an outer bearing support member a second passageway segment extending from a second mating opening to an outer opening communicating with said outside atmosphere; and
assembling said inner and outer support members to receive said bearing therebetween to meet one another with said mating openings aligned so as to create a vent passageway extending from said interior space to said outside atmosphere.

10. The method of claim 9, wherein said step of providing said first passageway segment comprises providing an inner radial bore extending from said interior space to said inner opening, an inner axial bore extending from said first mating opening to intersect said inner radial bore, and a plug blocking said inner radial bore where it meets said interior space.

11. The method of claim 10, wherein said step of providing said second passageway segment comprises providing an outer radial bore extending from said outer opening to a point within said outer bearing support member, and an outer axial bore extending from said second mating opening to intersect said outer radial bore.

12. The method of claim 9, wherein said step of providing said first passageway segment comprises isolating said inner opening from said interior space with a throat surrounding said shaft and defining a chamber between said throat and said shaft seal.

* * * * *